United States Patent
Phipps

Patent Number: 5,846,378
Date of Patent: Dec. 8, 1998

[54] TREATMENT OF SOLID CONTAINING MATERIAL DERIVED FROM EFFLUENT OF WASTEPAPER TREATING PLANT

[75] Inventor: Jonathan Stuart Phipps, Cornwall, United Kingdom

[73] Assignee: ECC International Ltd., United Kingdom

[21] Appl. No.: 822,420

[22] Filed: Mar. 21, 1997

[30] Foreign Application Priority Data

Mar. 29, 1996 [GB] United Kingdom .................. 9606638

[51] Int. Cl.[6] ................................... D21C 11/00
[52] U.S. Cl. ..................... 162/29; 162/189; 210/180; 210/928
[58] Field of Search .................. 162/4, 29, 189; 210/702, 723, 928, 175, 180

[56] References Cited

U.S. PATENT DOCUMENTS

| 3,320,076 | 5/1967 | Sutton et al. | 106/72 |
| 3,765,921 | 10/1973 | Puskar | 106/288 |
| 4,479,920 | 10/1984 | Dodson | 422/143 |

FOREIGN PATENT DOCUMENTS

| 0369650 | 2/1989 | European Pat. Off. |
| 2273701 | 6/1994 | United Kingdom . |
| WO95/18885 | 7/1995 | WIPO . |
| WO96/06057 | 2/1996 | WIPO . |
| WO96/32354 | 2/1996 | WIPO . |

OTHER PUBLICATIONS

WPI Abstract Accession No. 92-075327/10 JP 040018185A.

*Primary Examiner*—Stanley S. Silverman
*Assistant Examiner*—Dean T. Nguyen
*Attorney, Agent, or Firm*—Suzanne Kikel

[57] ABSTRACT

A method is described for the treatment of a solid containing material obtained from effluent from an industrial plant or process, eg. a plant for the de-inking of waste paper. Such effluent comprises an aqueous suspension of solids comprising organic material and inorganic particulate material. The inorganic particulate material contains a substantial amount of calcium carbonate and is likely also to contain kaolin or metakaolin. The solids may also contain carbon particles. The method includes subjecting the solid containing material to a heat treatment process such that the temperature is controlled to be maintained in the range 600° C. to 800° C. preferably 600° C. to 750° C., to cause burning of the organic material without decomposition of more than about 50% by weight, preferably not more than about 10% by weight, of the calcium carbonate present to produce a particulate calcium carbonate-containing inorganic material substantially free of organic material. The particulate product is preferably white and useful as a pigment or filler material, eg. in paper making.

17 Claims, 2 Drawing Sheets

TREATMENT OF SOLID CONTAINING MATERIAL DERIVED FROM EFFLUENT OF WASTEPAPER TREATING PLANT

BACKGROUND OF THE INVENTION

1. Field of the Invention

The present invention relates to the treatment of solid containing material derived from effluent, especially to recover useful materials therefrom.

In particular, this invention is concerned with a method for recovering useful materials from what has hitherto been regarded as the waste material produced by an industrial plant wherein the waste comprises an aqueous suspension containing a mixture of organic material and inorganic particulate material which has been employed as a filler or pigment material in a known product or process, eg. as a constituent of paper. The said plant may for example be one operated for de-inking waste paper.

Paper and paperboard products are generally made by preparing a dilute aqueous suspension containing cellulosic fibres derived from wood or from some other suitable fibrous material, and de-watering the suspension on a moving wire mesh belt to form a sheet material. The suspension may also contain a proportion of a mineral filler material which improves the brightness and opacity of the finished paper or board. Natural cellulosic fibrous materials are generally expensive, and the trees or other plants from which they are obtained must be replaced if the balance of the environment is not to be disturbed. It is therefore desirable to incorporate in the aqueous suspension from which the sheet material is made a substantial proportion of cellulosic fibrous material which has been recovered from waste paper. Most waste paper which is recycled has been printed on at least one of its surfaces, and it is necessary to separate the printing ink residue from the cellulosic fibres if the recovered material is to be suitable for use as a starting material in a paper making process. If the ink is not separated, the fibrous material will generally be unacceptably dark in colour. Generally, printing ink contains elemental carbon (carbon black) and possibly organic dyes which cause the dark colouration.

Commercially operated processes for de-inking waste paper generally comprise a pulping stage in which the waste paper is subjected to mechanical agitation in water which also contains sodium hydroxide which causes the fibres to swell, and which breaks down most ink vehicles by saponification or hydrolysis, sodium silicate which acts as a pH buffer and agglomerates detached ink particles to a convenient size, and a surfactant which wets the ink particles and helps to keep them in suspension. The suspension formed in the pulper is passed through a primary screening system in which heavy foreign bodies, such as staples, paper clips and pieces of grit are removed. The suspension passing through the screens is then fed to a treatment plant comprising one or more froth flotation cells, or one or more washing units, or a combination of washing units and flotation cells. The froth flotation cells are each provided near the bottom with a rotating impeller and means for admitting air under pressure in the form of fine bubbles in the region of the impeller. It may also be advantageous to add to the suspension, before it enters the flotation cell a reagent known as a collector which attaches itself preferentially to the ink particles and increases their affinity with air relative to that with water. As a result, the ink particles are preferentially lifted by the air bubbles to the surface of the suspension in the flotation cell, where they are discharged in a froth product.

In the washing units the pulp is subjected to agitation in fresh or recycled water, optionally containing a dispersing agent, and the washed pulp is then drained on a screen of aperture size such as to retain the relatively long cellulosic fibres, while allowing to pass the mineral and organic particles and the fine fibre fragments.

The suspension which is discharged from the bottom of the flotation cell, and/or the suspension which passes the screens of the washing steps, is de-watered and the de-watered material, which consists of substantially de-inked cellulosic fibre material, may be subjected to further purification steps before being finally de-watered and dried for re-use in a sheet forming process.

The treatment plant reject, which is often in the form of an effluent suspension comprising the froth product from a flotation stage and/or the suspension passing the screens of a washing unit, generally contains, in addition to the ink particles, a substantial proportion of the inorganic filler particles which were originally present in the waste paper. These filler particles usually consist predominantly of a mixture of kaolin clay and calcium carbonate in various proportions, although other inorganic filler particles such as talc, calcium sulphate or titanium dioxide may also be present in minor proportions. Hitherto, this treatment plant reject has had to be discarded as waste because of its very dark colour as a result of its high content of printing ink residues. There has therefore been a loss to the paper maker of potentially useful inorganic filler material. Also the paper maker has had to meet the expense of disposing of the treatment plant reject in a manner which has no undesirable effects on the environment.

It is an object of this invention to provide a process which will make it possible to treat and dispose of a reject, especially a dark reject, comprising an aqueous suspension containing organic material and inorganic particulate material, such as the reject from a waste paper de-inking plant, in an economical manner, and, at the same time, make it possible to recycle the inorganic particulate content of the reject for use in a paper making process or in other suitable applications.

2. Brief Description of the Prior Art

Prior art processes for the heat treatment of de-inking sludge waste are described in U.S. Pat. No. 3,320,076 and U.S. Pat. No. 3,765,921. In both processes the ash obtained from the heat treatment process is essentially calcined clay. Both processes would be unsuitable for heat treatment of a material comprising or obtained from paper de-inking waste comprising a substantial quantity of calcium carbonate.

International Patent Publication No. WO95/18885 (F. L. Smidth & Co.) describes a process in which a filler for paper making is recovered from paper sludge. The paper sludge is introduced into a stream of hot exit gas from a combustion chamber and conveyed to a drying and comminuting apparatus. Finely divided dry paper material in suspension in the gas is conveyed from the drying and comminuting apparatus to a solid/gas separator which separates the paper material from the gas. The paper material is then introduced into the combustion chamber and the organic content of the material is incinerated with evolution of heat. The mineral content of the paper material is calcined in the combustion chamber at a controlled temperature and for a suitable period of time, and the calcined material is finally cooled with air. The controlled temperature is generally in the range from 800° C. to 1000° C. (page 4, lines 24–26), in order to eliminate toxic and/or malodorous compounds in the paper sludge. A filler material is produced from the process.

Insofar as the process described in WO95/18885 is applied to treat a paper waste containing calcium carbonate the product produced thereby would suffer from abrasiveness problems as described hereinafter and would not be useful in applications where abrasiveness is required not to be above an acceptable upper limit.

The purpose of the present invention is to provide a process which is suitable for heat treatment of a material comprising or obtained from waste comprising an aqueous suspension containing organic matter and inorganic particulate matter, eg. paper de-inking waste, comprising a substantial quantity of calcium carbonate, to convert the inorganic content of such material to a form suitable for re-use as an inorganic particulate material, eg. for coating or filling paper or other products, which process is suitable for producing a particulate product without abrasiveness as described hereinafter and thereby useful in a variety of applications, especially where product particle non-abrasiveness is required.

SUMMARY OF THE INVENTION

According to the present invention in a first aspect there is provided a method for treatment of a solid containing material contained in or obtained from an aqueous effluent from an industrial plant or process, such effluent comprising an aqueous suspension of solids comprising organic material and inorganic particulate material the inorganic material including a substantial amount of calcium carbonate, the method comprising subjecting the solid containing material to a heat treatment process such that the temperature is controlled to be maintained in the range of from about 600° C. to about 800° C. to cause burning of the organic material without decomposition of more than about 50% by weight of the calcium carbonate present to produce a particulate calcium carbonate-containing inorganic material substantially free of organic material.

BRIEF DESCRIPTION OF THE INVENTION

Where a material containing calcium carbonate is heat treated at a temperature substantially above 800° C. significant decomposition of the calcium carbonate present to calcium oxide takes place. When calcium oxide is in a mixture with clays and other inorganic materials at high temperatures it forms glassy composites and/or particles having serious abrasiveness. We have found that the presence of calcium oxide in materials to be converted into products to be used as particulate pigment, coating, filler and extender materials is therefore undesirable, especially where the particulate material is required for use in paper coatings and fillers and the like wherein a non-abrasive material is required, eg. to avoid harm to machinery employed to process or apply such materials. The present invention therefore surprisingly and beneficially provides a method whereby inorganic particulate material in a calcium carbonate-containing solids waste also containing organic matter may be separated from the organic matter without causing excessive abrasiveness of the inorganic particulate material thereby rendering the inorganic material useful as a pigment or filler material or the like.

Although the amount of calcium carbonate decomposed in the method according to the present invention is desirably minimised, and is preferably not more than about 10% of the calcium carbonate present, decomposition of up to about 50% by weight of the calcium carbonate present can be tolerated if subsequent processing steps are applied as described hereinafter although such steps may conveniently be avoided if the amount of calcium carbonate decomposed is minimised and in any case is not greater than about 25% by weight. The amount of calcium carbonate which has been converted may be determined in a well known way, eg. by titration.

WO96/06057 describes a process in which a calcium carbonate containing material is heat treated but in that process the carbonate is converted generally to calcium hydroxide.

The solid-containing material treated by the method according to the first aspect of the present invention may be material derived form an aqueous effluent from a process for making or treating paper or paper waste. The organic material present in the solid material may comprise one or more of fibrous material such as cellulose, ink, adhesive material, eg. starch or latex, and chemicals, eg. water soluble polymers, employed as additives such as dispersants, flocculants, retention aids, etc. in paper making.

The solid-containing material treated may also include carbonaceous material, eg. carbon particles derived from printing ink and the method according to the present invention is preferably applied so as to oxidise the carbon present without causing excessive heating of the inorganic particulate material present. Such carbonaceous material may be oxidised in the second stage of a novel two stage process (which is an embodiment of the present invention) after controlled combustion of the organic content as described hereinafter.

The inorganic material present in the solid material treated in the method according to the first aspect may, in addition to calcium carbonate, comprise kaolin, metakaolin, other carbonate such as dolomite, calcium sulphate, mica, talc, titanium dioxide and other white particulate material employed in paper and other pigment or filler containing materials. The present invention is most suitable to treat wastes containing as inorganic particulate material a mixture comprising at least calcium carbonate and kaolin and/or metakaolin, since these two materials are calcium carbonate and either kaolin or metakaolin, normally form abrasive products when heated together in the methods of the prior art.

The present invention is applicable to treat material contained in or produced from effluent from a plant for the de-inking of waste paper wherein the material contains a substantial quantity of calcium carbonate and also a substantial quantity of kaolin and/or metakaolin. By "a substantial quantity" is meant at least 5 and up to 95% by weight relative to the total weight of the inorganic content of the solid material in the material treated.

Material obtained as waste from a paper de-inking plant contains substantial quantities of organic matter which is readily combustible and it is necessary in the method according to the present invention not to allow the heat generated by combustion of the organic matter to raise the temperature substantially above about 800° C., preferably not above 750° C. This is achieved either by using a process in which the conditions of operation are chosen so that the temperature will not rise above 800° C., preferably not above 750° C., and/or by monitoring the temperature of the process and adjusting the conditions of the process to reduce the heat produced if the temperature exceeds a safe level not above 800° C. preferably not above 750° C.

Where the solids in the material treated by the method according to the first aspect of the present invention includes carbonaceous material, eg. carbon, present in an amount of at least 0.01 per cent by weight, eg. at least about 0.5 per cent by weight based on the dry weight of solids present, the heat treatment process in the method may comprise a process having two or more heat treatment stages, herein called a "two-stage" process, comprising a first stage in which organic compounds are burned in a manner such that measures are taken to prevent localised temperatures exceeding 800° C. (preferably limiting temperatures to not more than 750° C.); and a second stage after the organic compounds present have been burned (or at least sufficient of them have been burned to eliminate substantially their heat generating capacity), in which any residual carbonaceous material is burned.

In the said second stage, the avoidance of temperature increases arising locally from heat of combustion is not required. For example, the two-stage process may include a first stage in which the delivery rate and temperature of air introduced to burn the organic compounds present are suitable to maintain the temperature below 800° C. preferably not greater than 750° C. Alternatively, the two stage process may include a first stage in which the material treated is heated in a limited supply of oxygen to burn organic compounds present. This may be followed by a second stage in which the material treated is heated in an excess supply of oxygen to burn any residual carbonaceous material present.

In the first stage of such two-stage processes the organic compounds present in the treated material are burned in a controlled manner to remove the heat-producing potential of such compounds without causing a runaway temperature increase. The second stage is provided to burn residual carbonaceous material which may be present and thereby remove residual black colouration from the material treated. Desirably, the material formed after heat treatment is a white powder or particulate material.

In the method according to the present invention the material to be treated may be obtained by de-watering an aqueous suspension obtained as an effluent from a plant for treating effluent from a paper making or coating plant from a plant for treating waste paper, eg. for de-inking paper waste so that the dry weight of solid material present in the suspension is at least about 20% by weight of the material to be treated. The material to be treated could have a solids content at any level above this concentration but since the de-watering required to achieve high solids concentrations is time consuming and costly solids concentrations having a dry weight of solid material in the range of from about 20% to about 60%, especially 40% to 60%, by weight are preferred (the remaining constituent of the material being water possibly with minor liquid additives).

The de-watering may be carried out by one or more known processes, eg. evaporation, filtration, pressing or centrifuging. The solids material after dewatering may comprise shredded and/or pressed pellets or lumps of moist material.

The heat treatment process in the method according to the present invention may be carried out in one of several different ways, eg. using one or more suitable vessels, eg. a furnace and/or a kiln. A fluid flow heating furnace in which the solid-containing material is suspended in a heating fluid flow is preferred in at least part of the process. Where the process comprises a two-stage process the different stages may be carried out in the same vessel or in different vessels. Where the same vessel is used in one or more stages the material treated may be subject to multiple passes through the vessel by a suitable recycling procedure.

A first example of a method which may be used for carrying out the first stage of the two stage heat treatment process is as follows.

Moist solid material is introduced into a kiln or furnace with a limited supply of oxygen-containing gas, and the kiln or furnace is heated to a temperature which is controlled to within the range from about 600° C. to about 750° C., preferably from about 650° C. to about 750° C., and most preferably from about 680° C. to 720° C., for a time such that the organic components decompose into volatile gases, and are removed leaving the mineral components of the solid material possibly mixed with a small quantity of carbonaceous material.

In the case of the said first method volatile gases may be evolved from the solid material which contain harmful compounds, such as tars and carbon monoxide, and these may advantageously be destroyed by passing the volatile gases through a second kiln or furnace which is at a temperature of at least 900° C., which is the temperature which is just sufficient to decompose any malodorous or otherwise undesirable compounds. Alternatively the exhaust gases may be passed through a suitable scrubber system A second example of a method which may be used for carrying out the first stage of the two stage heat treatment process is as follows.

Moist solid material, eg. lumps or pellets of shredded and/or pressed material is burned in a fluid flow furnace at a temperature which is controlled to be maintained within the range from 600° C. to 800° C., preferably about 600° C. to about 750° C., and most preferably to about 680° C. to 720° C., in which case the organic components of the solid material are substantially completely burned to harmless compounds, leaving the mineral components of the solid material mixed with a small quantity of carbonaceous material. The temperature in the furnace may be controlled during the burning process by suitable adjustment of the air flow rate applied.

The said second method for carrying out the first stage may suitably be carried out in a furnace of the toroidal fluid flow kind in which a toroidal fluid flow heating zone is established and particles to be calcined are injected into the heating zone. Furnaces of the toroidal fluid flow kind are known per se. Such furnaces are described for example in U.S. Pat. No. 4,479,920. Generally, a hot gas, eg. air, is passed through gaps between angled blades or vanes in a ring of blades or vanes provided in the operational chamber of the furnace. The blade ring is formed in an annular gap between the wall of the chamber and a central block, eg. an upwardly pointing conical portion, located on the axis of the chamber. Gas flow is caused to follow a rotary path in a doughnut shaped region around the block and in individual swirls within the rotary path. This ensures efficient heat transfer to material, eg. particulate material, to be heated in the gas flow.

The second stage of the two-stage heat treatment process may conveniently be carried out using a rotary kiln. The temperature in this stage is preferably in the range from about 650° C. to about 750° C., and most preferably from 680° C. to about 720° C.

The temperature maintained in the heat treatment process or in the first stage of a two-stage heat treatment process in the method according to the invention is selected so that the decomposition of organic components proceeds at an acceptable rate but, as noted above, that decomposition of any calcium carbonate present to calcium oxide is minimised.

The material treated by the method according to the present invention may, following the heat treatment process, be allowed to cool. As noted above, the cooled product will generally comprise a powder or particulate material which will comprise calcium carbonate possibly with one or more of clay, eg. kaolin clay, metakaolin, calcium sulphate, talc, mica, titanium dioxide and other mineral or inorganic particulate materials. Some of the materials, eg. clays present, may have been converted to a calcined form by the heat treatment process. The material obtained as a product is desirably white and free of dark particles, eg. carbon.

The said product may be useful with or without further processing and with or without addition to other materials in any of the various applications in which particulate calcium carbonate and/or clay compositions are known to be useful, eg. as compositions for adding as pigments, fillers, extenders or property modifiers for adding to paper, paper coatings, polymers, plastics, paints, sealants, ceramic compositions and the like. Such a product may be treated in a known way to provide properties known to be useful in the selected user application.

For example, the product obtained after heat treatment in the method according to the present invention and subsequent cooling may be further treated by re-suspension in an aqueous medium.

Where the product is re-suspended in an aqueous medium, the medium may contain one or more additives, eg. dispersants, anti-oxidants and the like normally employed in compositions for the aforementioned applications or in materials being processed to form such compositions.

After the product has been re-suspended in an aqueous medium it may be treated by comminution, eg. by grinding in a manner well known to those skilled in the art, prior to formation in a known way of a suitable composition for use in the application selected, eg. a composition for paper coating.

Generally the temperatures maintained in the heat treatment process in the method according to the present invention will be insufficient to decompose completely any alkaline earth metal compounds which may be present. Any decomposition of alkaline earth metal compounds which does occur will be manifested by an undesirably high pH value of the aqueous suspension, when the product is re-suspended, for example a pH of the order of about 10–11. The pH of the suspension may be decreased, if necessary, to below about 9, preferably below about 8, by adding a small quantity of a dilute mineral acid (or other pH reducer).

Alternatively, a carbon dioxide-containing fluid may be passed through an aqueous suspension of the product until substantially all of the alkaline earth metal ions present in the aqueous medium of the suspension eg. from hydroxides present, have been converted to alkaline earth metal carbonates, and the pH has been reduced to below about 9, preferably below about 8.

International Patent Application No. PCT/GB96/00884 (publication no. WO 96/32354) by the present Applicants describes a process for treating reject material from a plant for treating waste paper, which process provides a suitable procedure for treating material produced by controlled incineration in the method according to the first aspect of the present invention. The process described in the said Application comprises the steps of:

(a) subjecting the reject material to heat treatment at a temperature of at least 650° C. to form a calcined product;

(b) suspending the calcined product formed in step (a) in water; and (c) passing a carbon dioxide-containing gas through the suspension of calcined product in water formed in step (b) until substantially all of the alkaline earth metal hydroxides present in the suspension have been converted to alkaline earth metal carbonates. Preferably after step (b) the suspended solid material is ground.

A paper coating composition may be formed by mixing an aqueous suspension of pigment material comprising the product of the method according to the first aspect of the present invention together with an adhesive. The product employed in the composition may be mixed with one or more other pigments, eg. selected from those specified above. The adhesive may form from about 4% to about 30% by weight based on the total dry weight of pigment or pigments present. The adhesive may be one of the known paper coating adhesives employed in the art, eg. chosen from the group consisting of starches, proteinaceous adhesives such as casein and latices of, eg. styrene butadiene rubbers and acrylic polymers. The paper coating composition may also include a thickener, eg. in an amount of up to 2% by weight based upon the total dry weight of pigment or pigments present. The thickener may comprise one or more substances employed as thickeners in the prior art, eg. sodium carboxymethyl cellulose or synthetic acrylic thickeners.

The paper coating composition may be formed by mixing together an aqueous dispersed suspension of the product of the method according to the first aspect of the present invention, optionally with one or more further aqueous dispersed suspensions containing other pigments, eg. precipitated calcium carbonate, kaolin, metakaolin, titanium dioxide etc., together with the adhesive and any other optional constituents eg. thickener, in a manner familiar to those skilled in the art.

The white inorganic particulate material obtained as a product by use of the method according to the first aspect of the present invention, either with or without the application of resuspension, grinding and carbonation after controlled incineration, may be employed in a known way as a particulate filler, extender or property modifier in a known applications for such material. Where the material has been derived from de-inking or other sludge obtained from a processing plant at a paper mill the product may advantageously be re-used in a known way as a filler material in the production of paper at the same mill. The particulate product may be supplied to such a mill in one of various concentrations in water. The concentration may range from dilute suspension form to dry particulate solids. The particulate product after formation in the method according to the present invention may or may not be treated as appropriate, eg. by dewatering or not, where required, so that it may be delivered to the user plant, eg. paper making mill, in the required concentration.

The extent of dilution or concentration of the form in which the precipitate product is added to the user composition, eg. paper making composition, does not critically affect the properties of the resulting product, eg. paper sheet. It may, however, for economic and practical reasons be more suitable to supply the product in the form of a concentrated pumpable aqueous slurry. Where the product is supplied for use in a process at another location it may be preferable to dry the product prior to transport. Where the product has been concentrated or dried prior to delivery and subsequently re-dispersed in or diluted with clean water prior to re-use, the concentration and dilution steps do not materially affect the usefulness of the product.

In any event, where the particulate product is to be used as a filler material in paper making, the precipitate product may, as will be clearly evident to those familiar with the paper making art, be blended in various proportions with conventional filler materials, eg. precipitated or natural, eg. ground, calcium carbonate, kaolin and other clay, metakaolin, talc, calcium sulphate etc., the ingredients and composition as well as the host fibres being selected according to the quality of paper required to be produced. In general, these materials are likely to be in slurry form when they are mixed.

The paper maker will normally select the concentration of the aggregate material (produced in accordance with the present invention) in aqueous suspension and the delivery rate of the suspension at the point of addition to the paper making composition, eg. finish. As noted above, this may require re-dilution of a suspension which has been delivered to the paper mill in concentrated or dry form. Generally, the suspension added may contribute aggregate material which forms up to 30% by weight of the solids content of the paper making composition. Where other fillers, eg. as specified hereinbefore, also form part of the filler content of the paper making composition a total filler composition of up to 30% by weight of the solids content of the paper composition may be employed.

By use of the method according to the present invention organic materials and where present darkening components especially from printing ink, principally elemental carbon (carbon-black), can be removed from an organic and inorganic particulate containing waste, eg. paper de-inking waste and inorganic particulate material can be recovered with properties suitable to allow the product to be used as a pigment in paper coating or as a filler in paper or other materials. In particular, a product having acceptable brightness, particle size, lack of abrasion, and showing suitable light scattering, eg. for use as a pigment in paper coating or filling can be obtained.

There are three main reasons why achieving these properties is surprising:

a) The inorganic particulate materials required to be reclaimed decompose and react with each other at combustion temperatures. Kaolin is usually a constituent of the inorganic material as well as calcium carbonate. At 550° C. kaolin dehydrates and becomes metakaolin. Between 700° C. and 900° C. calcium carbonate decomposes to calcium oxide and carbon dioxide. The extent of this decomposition depends on the temperature, the particle sizes and the pressure of the operation, and particularly on the partial pressure (concentration) of carbon dioxide around the particles. As noted above, the decomposition is significant above 800° C. Calcium oxide and metakaolin can react to form calcium silicate, amorphous silica and other compounds at these temperatures, and the extent of the reaction increases with temperature. The reaction products are aggregated, hard and abrasive.

b) The combustion of the organic fraction of a solid from a sludge such as de-inking sludge creates a large amount of heat, which makes the local temperature around the inorganic particles difficult to control. The temperature obtained depends upon the rate of combustion and rate of heat transfer away from the particles. Typical temperatures reached by freely-burning wood materials such as paper are around 1000° C.

c) Carbon where present takes a long time to burn completely. All de-inking sludges contain carbon black from inks. In addition, carbon may be created during the incineration process if the process is not 100% efficient. This carbon comes from the pyrolysis (thermal decomposition) of organic compounds. The higher the temperature, the faster is the rate of carbon removal, but even at the relatively high temperatures used in conventional sludge-burning operations the carbon is not completely removed, and the resultant ashes tend to be grey.

In the method according to the present invention the reaction of the minerals with each other is minimised by control of the temperature. It is not practicable to keep the temperature so low that any kaolin will not be converted to metakaolin, but this need not be a problem. If the temperature is kept sufficiently low that calcium carbonate decomposition is prevented, then the inter-mineral reactions will not be able to occur. If the temperature is allowed to be slightly higher than this then it may be acceptable for some calcium carbonate (preferably not more than 25% by weight) to decompose, provided that the subsequent reaction of the calcium oxide with metakaolin occurs only to a limited extent. The harmful effects of calcium carbonate decomposition (eg. where this has occurred up to a level of 50% of the calcium carbonate present) and reaction with metakaolin may be mitigated to some extent by subsequent processing steps, eg. resuspension in an aqueous medium, grinding and carbonation to produce an acceptable final product. Such additional steps may be applied even where calcium decomposition has been minimised.

The problem of temperature control can be addressed in the method according to the present invention in one of two alternative ways as described above. Either the rate of combustion (and thus heat generation) during burning of the organic material is controlled and reduced, or the rate of heat transfer away from the burning particles is maximised. These are the alternative approaches of the two examples of methods embodying the invention described hereinbefore. In the first example, by restricting the amount of oxygen supplied to the furnace the rate of combustion and heat release is reduced. In the limit of no oxygen supply the material will be completely pyrolysed to carbon and will consume heat rather than produce it. In this approach a large amount of carbon will be produced which has to be burned away later. As the oxygen supply is increased both combustion and pyrolysis will occur and the temperature will be defined by the relative amount of each that is occurring. In the second example, by using an efficient fluid flow bed furnace (in particular a toroidal fluid flow heating zone furnace), the rate of heat transfer is sufficient to keep the local temperature down even as the rate of combustion is maximised and the degree of pyrolysis minimised.

The complete removal of carbon may conveniently be achieved using a second heat treatment stage eg. using a rotary kiln.

Thus, in both of the said examples of the two stage method, the first stage of the heat treatment is designed to remove the heat-generating potential from the organic material which constitutes fuel without letting the temperature rise too high. Once a significant amount of the organic material has been burned, temperature control is no longer a significant problem, and so the removal of the remaining organics and carbon can take place under different furnace conditions. Of course temperature control is still important to avoid substantial decomposition of calcium carbonate, but no special precautions need to be taken to keep the temperature down. It is convenient to split the first method into two stages, as described above, where the changeover occurs when the heat potential has been removed. This allows for faster subsequent carbon removal as this can be carried out in a plentiful supply of oxygen without loss of temperature control. A process in which the amount of oxygen available during the process is progressively increased could alternatively be employed. For example, a countercurrent device could be used, where solid material derives from reject sludge is fed in at one end and oxygen is fed in at the other end, so that the local concentration of oxygen increases gradually as the organic components of the material being treated are removed.

According to the present invention in a second aspect there is provided an inorganic particulate material which is formed as a product of the method according to the first aspect, the inorganic particulate material being substantially white and useful as a white pigment in paper coating or as a filler, extender a property modifier for paper or other material.

Preferably, the material according to the second aspect has an Einlehner abrasion value of not more than 100 g. m$^{-2}$ (grams per meter squared) preferably not more than 60 g.m$^{-2}$ Such abrasiveness values are surprising, for example, for inorganic particulate materials recovered from de-inking plant wastes using an incineration processes. For example, if solids obtained from an effluent sludge containing from a de-inking plant are incinerated in a conventional way, eg. by incineration at an applied temperature of at least 900° C. and no control over temperature rise we have found that the Einlehner abrasion value of the ash product obtained after incineration is typically greater than 300 g.m$^{-2}$ as exemplified hereinafter.

Embodiments of the present invention will now be described by way of example with reference to the accompanying drawings, in which:

DESCRIPTION OF PREFERRED EMBODIMENTS

Figure 1:
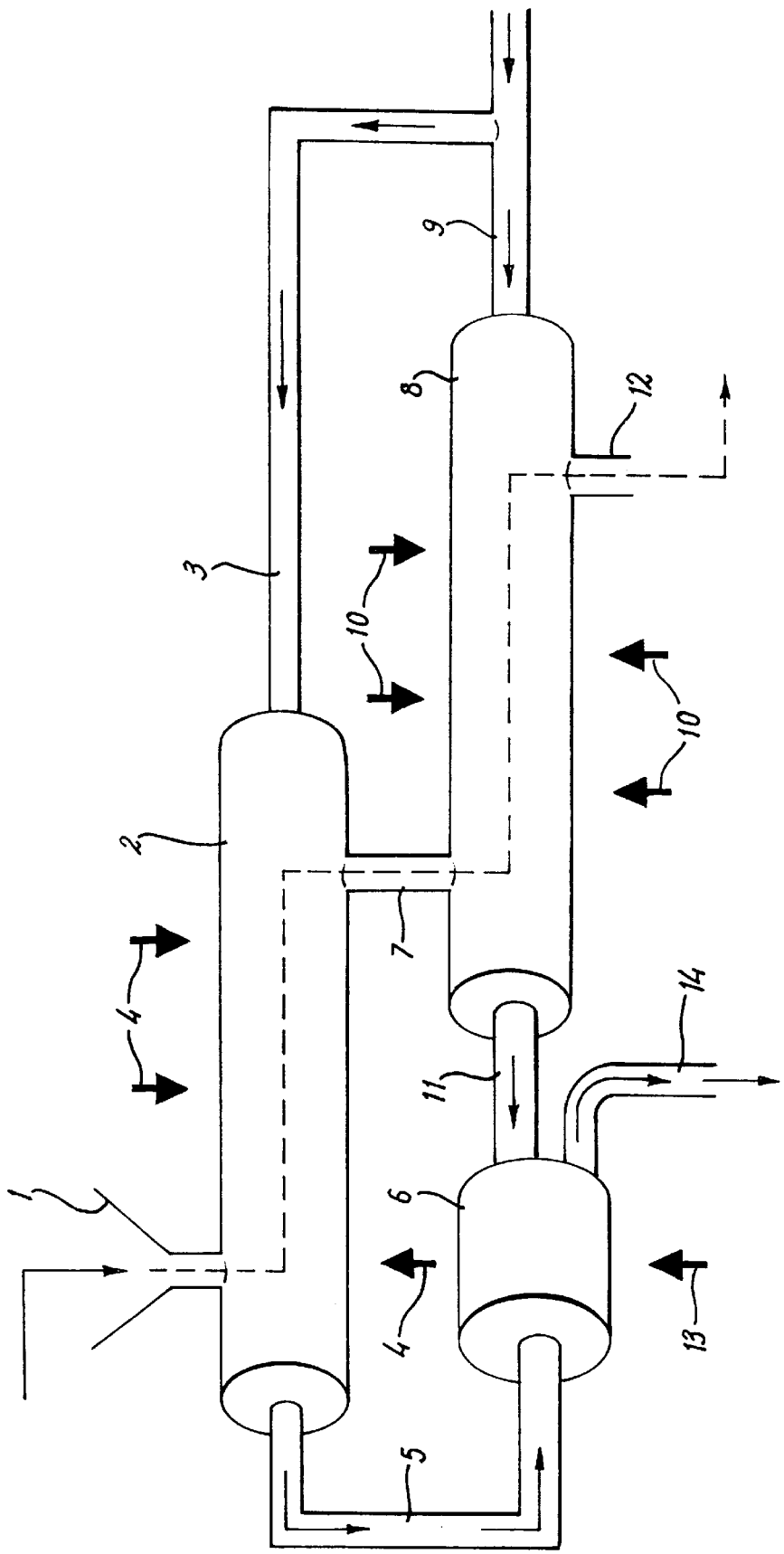
FIG. 1 is a diagrammatic sketch showing an arrangement of apparatus for carrying out a process embodying the invention.

As shown in FIG. 1, de-watered sludge from a plant for de-inking waste paper is supplied at a dry solids concentration of about 50% by weight to the feed hopper 1 of a first rotary kiln 2 to which air is supplied at a controlled rate through a conduit 3. The temperature within the kiln is maintained at from 650° C. to 750° C., initially by supplying heat by indirect heating means 4. Thereafter, heat is generated by the chemical decomposition of the organic components present in the sludge, and the temperature is maintained at 650°–750° C. by controlling the rates of supply of de-watered sludge and air. Substantially all of the organic components are converted into gaseous products which pass through a conduit 5 to a direct-fired afterburner 6. The mineral components of the sludge are substantially unaffected and are discharged from the kiln 2, together with a small quantity of carbonaceous material, through an outlet duct 7 which communicates with a second rotary kiln 8. Excess air is supplied to the kiln 8 through a conduit 9. The temperature in the second rotary kiln 8 is maintained at 650°–750° C. by controlling heating means 10. Gases are discharged through a conduit 11 to the afterburner 6, and the heat treated product is discharged through an outlet duct 12. The temperature in the afterburner 6 is maintained at a temperature of at least 900° C. by controlling the supply of fuel to a burner 13. The temperature maintained in the afterburner is sufficient to convert any harmful compounds present in the gases passing through conduits 5 and 11, such as carbon monoxide and tars, to harmless substances. Gases are discharged from the afterburner through a conduit 14 to means for recovering heat energy for re-use.

Figure 2:
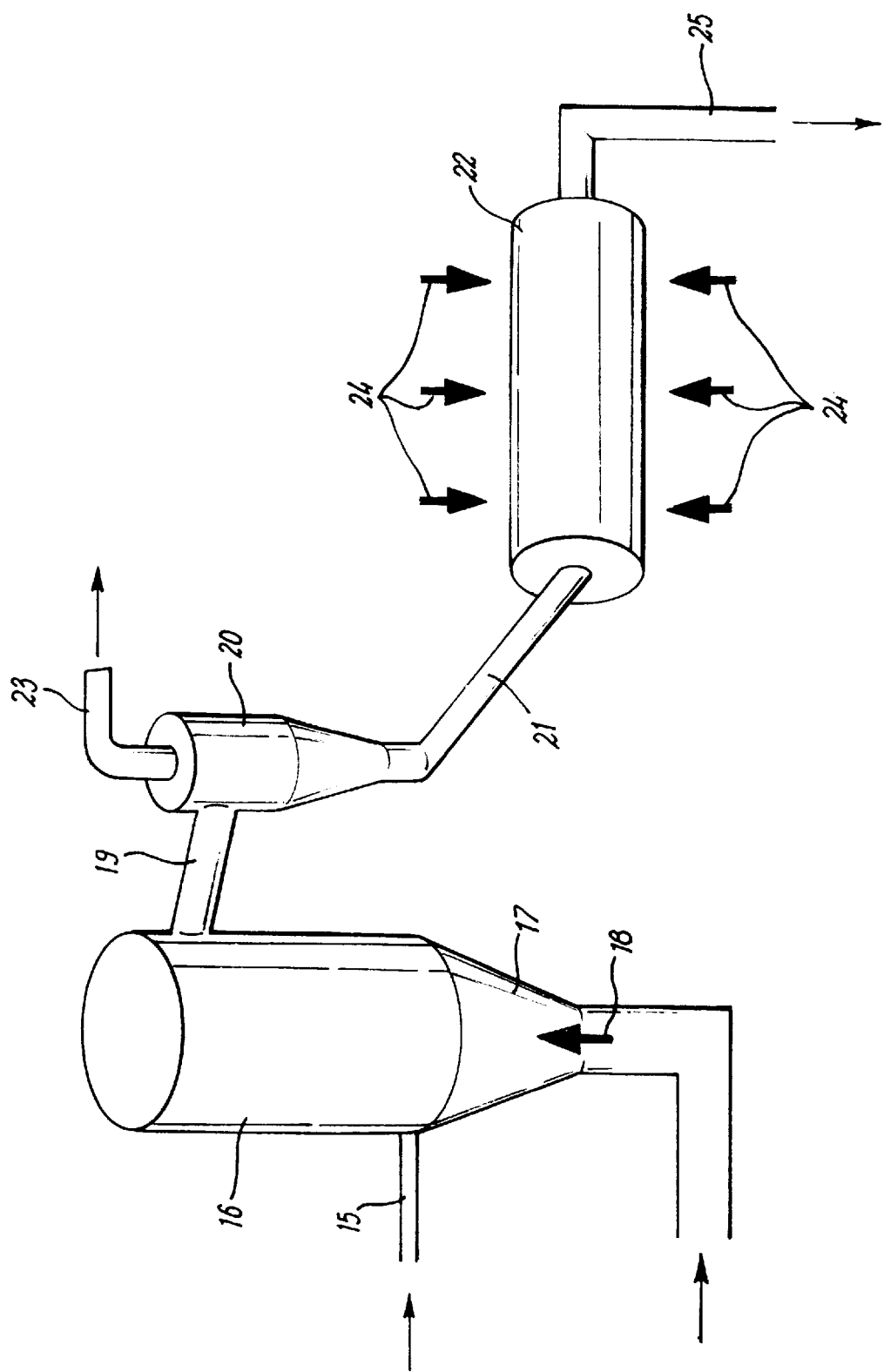
FIG. 2 is a diagrammatic sketch showing a second arrangement of apparatus for carrying out the invention.

As shown in FIG. 2, moist solid lumps from dewatered sludge from a plant for de-inking waste paper are fed at a dry solids concentration of about 50% by weight through a duct 15 into a fluid flow furnace 16, to which hot air is supplied through a conduit 17. The temperature in the fluid flow heating zone established in the furnace 16 by the flow of hot air is maintained at 650°–750° C., initially by heating the delivered hot air by burner means 18. Thereafter the chemical decomposition of the organic components of the delivered solids lumps may generate sufficient heat to maintain the required temperature, or heat may be supplied to the air as required, the rates of supply of solids and heated air being controlled to keep the temperature at the desired level. The gases and entrained mineral components of the treated solids are discharged from the furnace 16 through a conduit 19 to a cyclone separator 20. The mineral components, together with a small quantity of carbonaceous material, are separated from the gases and are discharged from the base of the cyclone through a conduit 21 to a rotary kiln 22. The gases separated by the cyclone separator 20 are discharged through a conduit 23 to a heat exchanger for recovering thermal energy for re-use. The efficiency of the combustion of the organic components in the furnace at a temperature in the range of from 650° C. to 750° C. is found to be such that these gases are substantially free of any harmful compounds. The temperature in the rotary kiln 22 is maintained at from 650° C.–750° C. by controlling heating means 24. The rotary kiln 22 provides oxidation of the remaining carbonaceous material. The heat treated mineral components, substantially free of carbonaceous material are finally discharged through a conduit 25.

EXAMPLES

Examples of the treatment processes described above with reference to FIGS. 1 and 2 are as follows.

Example 1

This is an example of the process described above with reference to FIG. 1 and investigation of the product produced thereby. Tissue mill de-inking sludge of approximate composition 43% by weight of calcium carbonate, 28% by weight of kaolin and 29% by weight of organic material was dried and pelletised. The pelletised material was then fed into a rotary furnace operating at a temperature in the range of from 700° C. to 750° C. The air supply to the furnace was sufficiently restricted so that the temperature of the material in the furnace remained at all times within this temperature range. The average residence time of the material in the furnace was between 30 and 50 minutes. A dark, sooty product was obtained which was found to have an ISO brightness value of 19. Titration of the product with hydrochloric acid, first to pH9 and then to pH5 showed that approximately 10% by weight of the calcium carbonate had decomposed to calcium oxide. The gas produced from this operation was found to contain high levels of carbon monoxide and heavier volatile organic compounds, and was removed and treated separately.

The solid product from this operation was then passed through the rotary furnace at the same temperature a second time, this time with air in large excess of that needed to burn off the residual organic material and carbonaceous materiel. The brightness of the product was now found to be 65 ISO, and titration with hydrochloric acid showed that no more of the calcium carbonate had decomposed.

After a third pass through the kiln, the brightness of the product had increased to a value of 71 ISO. After neutralisation with carbon dioxide and some further processing by grinding in an attrition grinding mill with sand as the grinding medium at an energy input of 50 kWh/tonne, a product with an ISO brightness of 74, a particle size distribution such that 80% by weight of the particles had an equivalent spherical diameter smaller than 2 μm, and an Einlehner abrasion value of 32 $g.m^{-2}$ was produced. This abrasion value compares with typical figures for virgin pigments of: Filler Clay 60 $g.m^{-2}$; Coating Clay 40 $g.m^{-2}$; and Coating $CaCO_3$ 20 $g.m^{-2}$.

Example 2

This is an example of the process described above with reference to FIG. 2 and investigation of the product produced thereby. Lumps of solid obtained from dewatering of de-inking sludge from a newsprint mill of approximate composition 50% by weight of water, 30% by weight of organic material, 13% by weight of kaolin and 7% by weight of calcium carbonate were fed continuously into a toroidal fluid flow furnace operating with a toroidal heating zone temperature of 700° C. The solid product leaving the furnace with the exit gas stream was collected by means of a cyclone. The average ISO brightness of the product leaving the cyclone was 20, and titration with hydrochloric acid showed that approximately 14% by weight of the calcium carbonate had been converted to calcium oxide. Analysis of the exit gas from the furnace showed carbon monoxide levels of less than 0.1% by weight, with a carbon dioxide content of 6.8% by weight, thus indicating efficient combustion of the organic material. The solid product was then fed into the same rotary furnace as was used in Example 1, the temperature being maintained in the range of from 700° C. to 750° C., and the residence time being from 30 to 50 minutes. The product from this furnace was found to have an ISO brightness of 65. After neutralisation with carbon dioxide and grinding with sand in an attrition grinding mill with an energy input of 100 kWh/tonne, the final product was found to have an ISO brightness of 70, a particle size distribution such that 60% by weight of the particles had an equivalent spherical diameter smaller than 2 μm, and an Einlehner abrasion value of 52 $g.m^{-2}$.

Example 3 (comparative)

Various samples S1 to S6 were prepared consisting of pellets of solid containing material derived from de-inking sludge from the waste paper de-inking plant of a paper mill. The material had the same composition and water content as that treated in Example 1. The Samples S1 and S2 were incinerated in the paper mill's own furnace which is of a fluidised bed type at a temperature of about 900° C. No steps were taken to restrict rises of temperature (above that applied by the heating system of the furnace) caused due to heat given off by combustion of organics in the treated pellets.

The samples S3 to S6 were incinerated in a rotary kiln as in Example 1 but using temperatures of respectively 900° C., 900° C., 1100° C. and 1100° C. Again, no steps were taken to restrict temperature rises caused due to heat given off by combustion of organics.

The ash products obtained after incineration of Samples S1 to S6 were suspended in water, ground with sand as in Example 2 using a grinding energy of either 100 or 200 $kWht^{-1}$ and the resulting suspension was carbonated with $CO_2$ as in Example 1.

The results obtained are shown in Table 1 as follows. A product embodying the present invention obtained after a single controlled incineration step as employed in Example 1 followed by re-suspension, grinding at 100 $kWht^{-1}$ and carbonation is also included for comparison, denoted as Sample S7.

TABLE 1

| Sample No. | Applied temperature (°C.) | Grinding energy ($kWht^{-1}$) | % >10 μm | % <2 μm | Abrasion $g \cdot m^{-2}$ |
| --- | --- | --- | --- | --- | --- |
| S1 | 900 | 100 | 6 | 40 | 390 |
| S2 | 900 | 200 | 4.5 | 4.5 | 380 |
| S3 | 900 | 100 | 3.6 | 36 | >500 |
| S4 | 900 | 200 | 0.7 | 47 | 300 |
| S5 | 1100 | 100 | 3.9 | 34 | >500 |
| S6 | 1100 | 200 | 0.6 | 44 | 320 |
| S7 | 700 | 100 | 0.5 | 93 | 44 |

In Table 1 columns headed %>10 μm and %<2 μm show the percentage by weight of particles in the product having particle sizes as stated.

As can be seen from Table 1, the product embodying the invention obtained from Sample S7 even after re-suspension, grinding and carbonation is less abrasive and finer than those obtained using a similar procedure but including conventional incineration as applied to Samples S1 to S6.

I claim:

1. A method of treating solid containing material contained in or produced from an effluent or waste from a process for the treatment of waste paper, the solid-containing material comprising constituents of the waste paper and including organic material including cellulose fibers and inorganic particulate material including calcium carbonate and other inorganic particulate material included in the waste paper, the calcium carbonate constituting from 5% to 95% by weight of the inorganic particulate material, the method including the step of heat treating the solid-containing material to incinerate the organic material present and to leave a residue of the inorganic particulate material substantially free of organic material, the temperature of the treated solids containing material in the heat treating step being controllably maintained in the range of from about 600° C. to about 800° C. to cause incineration of the organic material without decomposition of more than 50% by weight of the calcium carbonate present, and resulting in the residue of the inorganic particulate material having reduced abrasiveness for use in making or coating paper.

2. A method as claimed in claim 1 and wherein not more than 25% by weight of the calcium carbonate present is decomposed.

3. A method as claimed in claim 2 and wherein not more than 10% by weight of the calcium carbonate present is decomposed.

4. A method as claimed in claim 1 and wherein the treated solid containing material includes also a substantial amount of kaolin or metakaolin or both.

5. A method as claimed in claim 1 and wherein the treated solid containing material is obtained by dewatering an effluent produced by a plant for making paper or treating paper or paper waste.

6. A method as claimed in claim 1 and wherein the treated solid containing material is obtained from a plant for de-inking waste paper and includes also carbonaceous material.

7. A method as claimed in claim 1 and wherein the heat treatment process is applied in two or more stages wherein in a first stage organic compounds are burned in such a manner that the temperature is not allowed to exceed about 750° C. and wherein in a second stage following directly or indirectly after the said first stage residual carbonaceous material is burned.

8. A method as claimed in claim 7 and wherein the said first stage is carried out in a vessel in which a limited air supply is delivered.

9. A method as claimed in claim 7 and wherein gaseous compounds evolved from the burning of organic compounds present in the material treated are conveyed to another vessel in which such gaseous compounds are decomposed at a higher temperature.

10. A method as claimed in claim 7 and wherein the first stage is carried out in a furnace providing a fluid flow heating zone in which the solid containing material is heated wherein in the delivery of fluid to provide the heating zone is controlled to control the temperature of the heat treatment.

11. A method as claimed in 7 and wherein the furnace is of the kind in which a toroidal fluid flow heating zone is established.

12. A method as claimed in claim 7 and wherein the said second stage is carried out in a rotary kiln with an excess supply of oxygen.

13. A method as claimed in claim 1 and wherein the material to be treated is prepared by de-watering an aqueous suspension obtained as an effluent from a plant for de-inking paper waste and wherein the dry weight of the solid material present in the suspension after de-watering is in the range 20% to 60% by weight.

14. A method as claimed in claim 1 and wherein the product formed by the heat treatment is suspended in an aqueous medium and wherein the pH of the aqueous medium is adjusted during or after suspension of the product.

15. A method as claimed in claim 14 and wherein a dilute acid is added to reduce the pH of the suspension formed in the aqueous medium to below about pH9.

16. A method as claimed in claim 14 and wherein a carbon dioxide containing fluid is added to reduce the pH of the suspension below about 9.

17. A method as claimed in claim 14 and wherein the suspension formed by suspending the product in an aqueous medium is treated by a grinding process prior to pH adjustment.

* * * * *